Jan. 3, 1933.                G. ZAPF                1,893,119
              CABLE FOR COMPARATIVELY DEEP SEAS
                     Filed Sept. 12, 1928
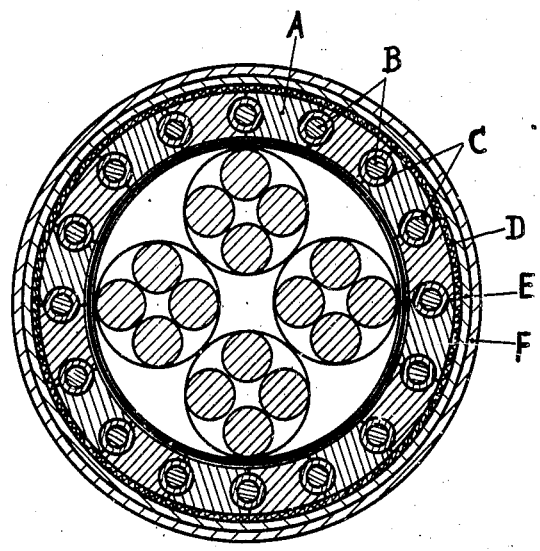
G. Zapf
    INVENTOR
By: Marks & Clark
           Attys.

Patented Jan. 3, 1933

1,893,119

UNITED STATES PATENT OFFICE

GEORG ZAPF, OF RIEHLERWALL, COLOGNE, GERMANY, ASSIGNOR TO FELTEN & GUILLEAUME CARLSWERK ACTIEN-GESELLSCHAFT, OF COLOGNE-MULHEIM, GERMANY

CABLE FOR COMPARATIVELY DEEP SEAS

Application filed September 12, 1928, Serial No. 305,541, and in Germany September 16, 1927.

The invention relates to a cable for comparatively deep seas having a pressure protecting covering underneath the lead or gutta-percha covering, which protecting covering consists of profile wires formed of aluminum and the object of the invention is, to improve the pressure protecting covering by making it perfectly water-tight.

In the case of pressures of a few hundred atms. as they occur in deep seas, the profile wires of the pressure-protecting covering are so strongly compressed that most of the gaps between the profile wires close. However, the remaining gaps are sufficient under the high pressures to allow the water to penetrate into the interior of the cable when the lead sheathing is damaged. In order to make also the pressure protecting covering perfectly water-tight according to the present invention, the pressure protecting covering consists of a tube of profile wires known per se, in which wires of circular cross-section are inserted between each two profile wires in semi-circular recesses of the profile wires. According to the invention, the wires of circular cross-section consist of steel wires or wires of another material having a high tensile strength, each wire being surrounded by a thin lead covering. At the pressures existing in deep seas, the lead is compressed into the gaps which remain between the profile wires, whereby the pressure protecting tube becomes perfectly water-tight. This construction enables a very thin lead covering to be used over the pressure protecting covering instead of a thick or sometimes double lead sheathing, which thin lead covering need protect the cable only before and during the laying of the cable against the penetration of moisture and water.

It is essential in structures of this kind that the wires or strips A be of a cross section other than round or square, therefore the term "profile" has been applied thereto. These elements must be of such form that their sides intimately contact to effectively encase the wires B.

The accompanying drawing illustrates by way of example one form of construction according to the invention in connection with a telephone cable containing four quads. The light metal wires A of the pressure protecting covering are of trapezoidal cross-section and are provided with recesses in which the steel wires B are inserted. The steel wires are surrounded by lead coverings C. A thin layer D of a material impermeable to water, for instance gutta percha, is provided around the pressure protecting covering. Two lead sheathings E and F may surround the layer D and they in their turn may be surrounded by the usual armouring and bolster.

What I claim is:

1. A cable for comparatively deep seas having a pressure protecting covering constituted by aluminium profile wires or profile strips having their sides partly in intimate contact and partly formed with recesses lying opposite each other, steel wires of a specially high tensile strength inserted in the said recesses formed in the sides of the profile wires or profile strips of the pressure protecting covering and a lead covering surrounding each of the steel wires.

2. A cable for comparatively deep seas having a pressure protecting covering consisting of a plurality of circularly aligned aluminium profile strips having their sides partly in intimate engagement and inclined to prevent relative movement when subjected to pressure and partly formed with recesses lying opposite each other, steel wires of a specially high tensile strength confined in the said recesses formed in the sides of the profile strips and a lead covering surrounding each of the steel wires.

In testimony whereof I have signed my name to this specification.

GEORG ZAPF.